July 27, 1965 C. J. PETERS 3,197,105

RAPID RESPONSE TAPE TRANSPORT

Filed June 28, 1961 5 Sheets-Sheet 1

INVENTOR.
CHARLES J. PETERS
BY
Spencer E. Olson
ATTORNEY

July 27, 1965 C. J. PETERS 3,197,105

RAPID RESPONSE TAPE TRANSPORT

Filed June 28, 1961 5 Sheets-Sheet 2

INVENTOR.
CHARLES J. PETERS
BY
Spencer E. Olson
ATTORNEY

RAPID RESPONSE TAPE TRANSPORT

Filed June 28, 1961

5 Sheets-Sheet 3

INVENTOR.
CHARLES J. PETERS
BY
Spencer E. Olson
ATTORNEY

July 27, 1965 C. J. PETERS 3,197,105

RAPID RESPONSE TAPE TRANSPORT

Filed June 28, 1961 5 Sheets-Sheet 4

INVENTOR.
CHARLES J. PETERS

BY Spencer E. Olson

ATTORNEY

INVENTOR
CHARLES J. PETERS
BY
Spencer E. Olson
ATTORNEY

United States Patent Office 3,197,105

Patented July 27, 1965

3,197,105

RAPID RESPONSE TAPE TRANSPORT

Charles J. Peters, Wayland, Mass., assignor to Sylvania Electric Products Inc., a corporation of Delaware Filed June 28, 1961, Ser. No. 123,931
5 Claims. (Cl. 226—176)

This invention relates generally to magnetic tape machines for record and/or play-back operations, and is more particularly concerned with a tape transport mechanism for moving the tape past the transducer at an appropriate speed and to rapidly start and stop the tape on command.

This application is a continuation-in-part of applicant's previous and now abandoned application Serial No. 861,-012, filed December 21, 1959.

Conventional magnetic tape machines employ transport means including a continuously driven capstan and a continuously rotating pinch roller between which the tape is fed, the tape being driven by pressing the tape against the capstan by the pinch roller. In machines intended for recording of digital information, frequent starting and stopping of the tape is required, and to reduce the gap between the speeds at which computers operate and the rate at which information can be fed into or out of the computer, it is imperative that the times required for starting and stopping the tape be minimized. In currently available machines of which applicant is aware, the time interval between the command to start or stop and the completion of the execution is between 1.5 and 10 milliseconds. An analysis of a prior art tape transport, shown in FIG. 1, will reveal the major factors contributing to this objectionably long time interval.

A single drive station is shown, consisting of a driven capstan, and a pinch roller supported on a fork which, in turn, is pivotally mounted at an appreciable distance from the roller. The capstan is continuously rotating in one direction, the magnetic tape being moved by energizing a solenoid which urges the pinch roller toward and capstan to trap the tape against the rotating capstan. The effect of rotational inertia of the pinch roller is minimized by keeping it continuously rolling, and the effect of translational inertia is minimized by positioning the pinch roller close to the capstan so that it need be moved only a short distance to engage the tape upon energization of the solenoid. In a mechanism of this type the time to start the tape is apportioned into three rather definite time intervals; (1) the time to apply the necessary current to the solenoid, (2) the time required for the pinch roller to move from its rest position into engagement with the tape, and (3) the time for various mechanical transients in the mechanism and the tape to die out.

The time to attain the necessary current in the solenoid being largely a matter of proper magnetic circuit design, inductance, and applied voltage, this is not an important part of the start time, and in typical tape transports, the current rise time is only of the order of several hundred microseconds. More serious is the time of movement of the pinch roller into the drive position, which may require between one-quarter and one-half of the total start time. It is clear that the pinch roller movement time can be reduced by making the mass of the pinch roller assembly small, the distance to be traversed small, and by designing the solenoid to exert a large force on the pinch roller mechanism. If it is assumed that the force exerted by the solenoid on the pinch roller assembly is constant, the movement time is $$t_n=\sqrt{\frac{2ms}{F}}$$

where $m$ is the mass of the pinch roller assembly, $s$ is the distance to be traversed, and F is the force exerted by the solenoid. It will be apparent from this relationship that large changes in $m$, $s$, and F must be made if the movement time $t_n$ is to be significantly affected.

The third factor, which accounts for the balance of the total start time, is the duration of various mechanical transients which are introduced upon actuation of the solenoid, the most significant of which is the bounce of the pinch roller. As the pinch roller travels from its rest position toward the capstan, it attains considerable velocity. It has evidently been unavoidable in prior art transports to eliminate the rebound of the pinch roller after it strikes the capstan (the tape being sandwiched in between, of course). Apparently the time required for this rebound to occur sets the fundamental limitation on minimum start time in heretofore available tape transports. This bounce, or rebound, is simply a manifestation of the principle of the conservation of momentum; in moving from the rest position the pinch roller attains considerable velocity, and the impact with the tape, supported on the rigid capstan, is at least moderately elastic and rebound is certain to occur. The pinch roller supported by the fork is a mechanical system with relatively high mass and low spring constant, and hence has a low natural frequency. The fork, which distorts in flexure, is the spring in this system and the pinch roller is the mass. Apparently, even when the fork is made as stiff as possible, to give the maximum spring constant, and the mass of the pinch roller is minimized, the shortest attainable period for this vibrating system is of the order of one millisecond.

As will be mathematically shown later, and as illustrated by the plot of FIG. 2, the tape may be accelerated up to full speed virtually instantaneously. As shown in FIG. 2, which is a plot of tape velocity as a function of time for a drive of the type shown in FIG. 1, the command to start the tape is given at $t=0$. The current in the solenoid probably reaches its full value in approximately 100 microseconds, but thereafter about 900 microseconds are required to move the pinch roller into engagement with the tape. After this 900 microsecond dead time, the tape accelerates from zero to full speed in approximately 350 microseconds. The tape does not remain at full speed, however, because the pinch roller bounces away from the capstan whereby the speed decreases to a low value, at 1.5 milliseconds, and again returns to full speed, at approximately 2 milliseconds, the total elapsed time between when the tape first reaches full speed to when a constant velocity is established being approximately 700 microseconds. Thus, the movement of the pinch roller, and the suppression of mechanical transients, accounts for approximately 1600 microseconds or 80% of the total time of 2000 microseconds required to get the tape up to speed.

In general it is the object of the present invention to provide tape driving means which reduces the time necessary to bring the tape up to full speed, and/or to stop the moving tape, after initiation of the command.

Another object of the invention is to provide a tape drive mechanism which will reliably operate regardless of irregularities in tape thickness.

Another object of the invention is to provide a tape drive mechanism which introduces negligible skew to the tape.

Another object of the invention is to provide tape driving means which accomplishes its function without exciting mechanical transients to which all mechanical systems are subject.

Another object of the invention is to provide tape driving or braking means which is simple in mechanical construction and rapidly actuable by an electric current.

Another object of the invention is to provide a tape driving mechanism for transporting a tape in the forward and reverse direction and capable of rapidly reversing direction of motion without intermediately braking the tape to a stopped condition.

Briefly, these objects are achieved by providing a pair of opposed continuously rotating drive rollers between which the tape is carried. The roller members are supported to normally contact the tape with a force greater than zero but less than that required to overcome the drag on the tape due to friction, tape weight, etc. When it is desired to drive the tape, means engaging at least one of the drive rollers, when energized, displaces that roller member by an infinitesimal amount to increase the traction between the roller members and the tape to the larger finite value required to trap the tape between the rollers and impart a linear velocity to the tape equal to the peripheral velocity of the roller members.

In a preferred embodiment, the drive rollers are two opposed thin-walled tubular members respectively supported on a pair of cylindrical bearing members of slightly smaller diameter. The tape is carried between the two tubular members which are driven in opposite directions on their respective bearings. An elongated force bar, coextensive with the length of the tubes, is resiliently supported within each of the tubes to engage the inner surface of its respective tube opposite a common line of roller-to-tape contact with sufficient force to maintain the tubes in continuous contact with the tape but insufficient to drive the tape. Each of the force bars is positioned between the pole pieces of an electromagnet supported within each of the bearing members, the electromagnets when energized initiating a stress wave in a corresponding force bar which is propagated at the speed of sound in the material of the bars toward the line of roller-to-tape contact. Upon reaching the interface between the bar and the inner surface of the roller member, the stress waves elastically deforms the tubular member by a very small amount to increase the traction between the tubes and the tape to the finite value required to trap the tape. The tendency of the initial stress wave following energization of the electromagnet to be reflected is counteracted by the wave shape of the exciting current whereby "bounce" is minimized and driving traction maintained until the energizing current is removed. There is negligible movement of the force bars between their non-driving and driving positions, and by making the dimensions of the force bar in the radial direction small, the force necessary for driving the tape is applied very quickly after application of the activating current.

Other objects, features and advantages of the invention will become apparent from the following detailed description, taken in conjunction with the accompanying drawings, in which.

Figure 3:
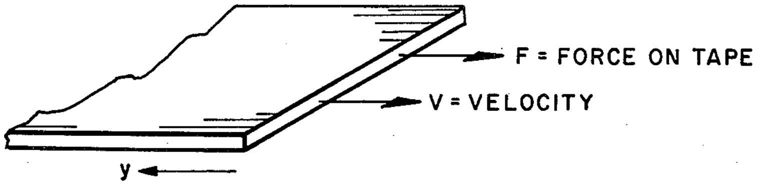
FIG. 3 is a free body diagram of a tape, useful in analyzing the forces necessary to accelerate the tape.

Before proceeding with a description of the mechanism for accomplishing the objects of the invention, it will be useful to analyze the behavior of an elastic body when an instantaneous change in velocity is imposed at a point thereon, for it is this situation which necessarily occurs in the rapid starting and stopping of a tape. Consider the tape as a long elastic body of uniform cross-section, as shown in FIG. 3, and assume that the velocity of the cross-section at $y=0$ is changed instantaneously from zero to V. The force required to accomplish this change in velocity and the maximum stress in the tape will be calculated. If all parts of the tape acquired the velocity V instantaneously, the force required to impart this velocity jump would be infinite. However, as will be seen, all parts of the tape do not instantaneously assume the velocity V. If a constant force F is applied at $y=0$, only the cross-section at $y=0$ will assume the velocity V at $t=0$. This jump in velocity will propagate down the tape at the speed of sound in the medium of the tape. The particles ahead of the step in velocity will be at rest, and the particles behind the step will have the velocity V.

If various energy dissipative mechanisms in the tape are neglected, a mechanical disturbance in the tape obeys the wave equation, $$\frac{\delta^2\zeta}{\delta t^2}+V_s{}^2\frac{\delta^2\zeta}{\delta y^2} \quad (1)$$

where $V_s$, the velocity of sound in the tape, is $\sqrt{E/\rho}$ $\zeta$ is the displacement of the tape from the rest position, $\rho$ is the density of the tape, and E is the modulus of elasticity of the tape. Solutions of this equation are of the form $$\zeta=f(y-V_st)+g(y+V_st) \quad (2)$$

The two portions of Eq. 2 describe traveling waves traveling in the positive and negative $y$-direction, respectively. According to these equations, a disturbance once imposed on the tape will be propagated along the tape, unchanged in form, at the velocity of sound $V_s$. If the cross-section at $y=0$ is suddenly given a velocity V, the displacement of this cross-section will then be $\zeta=Vt$. Under this condition, Eq. 2 becomes $$\zeta=-\frac{V}{V_s}(y-V_st) \text{ for } y>0 \quad (3)$$

$$\zeta=\frac{V}{V_s}(y+V_st) \text{ for } y<0 \quad (4)$$

Figure 4:
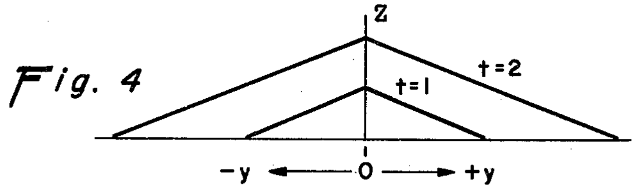
FIG. 4 is a diagram illustrating the disturbance in a tape upon application of an accelerating force thereto.

These functions are shown in FIG. 4 for two arbitrary times, $t=1$ and $t=2$. These curves show that at the end of these times only a part of the tape has assumed the velocity V. The portions far removed from the disturbance are still at rest; however, in due time, determined by the velocity of sound in the tape, they too will attain the velocity V.

For a typical magnetic tape, the modulus of elasticity E is of the order of $2.6\times10^5$ pounds per square inch, and the density $\rho$ is about 1.39 grams per cubic centimeter. Accordingly, the velocity of sound in this medium is $1.34\times10^5$ centimeters per second, or the propagation time is about 19 microseconds per inch. Thus, if a recording head is separated from the drive capstan by two inches, and a change in velocity of the tape occurs at the capstan, 40 microseconds will elapse before this change is detected at the recording head.

The strain at any point on the tape is given by $$\frac{\delta\zeta}{\delta y}$$

Applying Hookes' Law, the force at any point on the tape is $$F=EA\frac{\delta\zeta}{\delta y}$$

From Equation 4, $$\frac{\delta\zeta}{\delta y}=\frac{V}{V_s}\text{ for }y<0$$

and hence, $$F=EA\frac{V}{V_s}$$

where A is the cross-sectional area of the tape.

For a two-inch wide, 0.0015 inch thick tape, and a velocity V of +30 inches per second, $F=0.3$ pounds for $y$ 0; i.e., a tension wave starts at the capstan and travels in the negative $y$-direction. By the same argument, a compression wave, of force equal to −0.3 pound, originates at the capstan and travels in the positive $y$-direction. The difference in force, that is, 0.6 pound, must be applied by the capstan to bring the velocity up to 30 inches/second. This force of 0.6 pound compares with an ultimate tensile strength for two-inch tape of 28.8 pounds.

The significant conclusion from this analysis is that the tape velocity at any point can be changed instantaneously with a finite force. This change in velocity will propagate to other portions of the tape at the velocity of sound in the tape. The behavior of the tape is analogous in many respects to the behavior of an electrical transmission line. Velocity of the tape is analogous to current in an electrical system, displacement is analogous to charge, force is analogous to voltage, elasticity is analogous to distributed capacity and density is analogous to distributed inductance. A rigid mass corresponds to a lumped inductance. To change the current instantaneously in an inductance requires an infinite voltage. However, even though the transmission line contains inductance (as well as capacitance) the current can be changed instantaneously with a finite constant voltage.

Strictly speaking, the above analysis applies to an infinitely long elastic member of uniform cross-section lying in a plane and free of energy dissipative mechanism. The plastic and metallic tape and metallic wire used in magnetic recording, as well as paper tape and tapes of other material are good approximations to these conditions insofar as they are usually long, uniform in cross-section, and non-dissipative; stress waves can be propagated in them over several feet before significant changes in amplitude and shape occur. However, it is not usually convenient to dispose the tape on a flat plane. The inactive portions of the tape are coiled on a reel or loosely folded in a bin. The radius of curvature of the folds when tape is stored in a bin are evidently large enough to be a good approximation to a plane. When the tape is wound on a reel, the tape in the reel does not behave as indicated above because of the close mechanical coupling between layers. For this reason, the portion of the tape near the drive stations must be isolated from the tape in the reels. This isolation is achieved by forming the tape into loops the lengths of which are free to change in accordance with the difference in velocity of the tape at the drive stations and the velocity of the tape at the reel.

By elimination, from the foregoing analysis it is seen that the time delays involved in starting the tape in motion in prior art transport mechanisms are mainly due to the inertia and time for motion of the pinch roller, and not to any limitation of the tape itself after the driving force is applied. These time delays are avoided with the present invention by the provision of a mechanism which can deliver the necessary driving force without gross movement of mass. Moreover, the force exerted by the drive mechanism of the present invention is largely independent of the thickness of the tape and position of the driver rollers, thus eliminating a requirement for extremely precise machining of the capstan.

Figure 5:
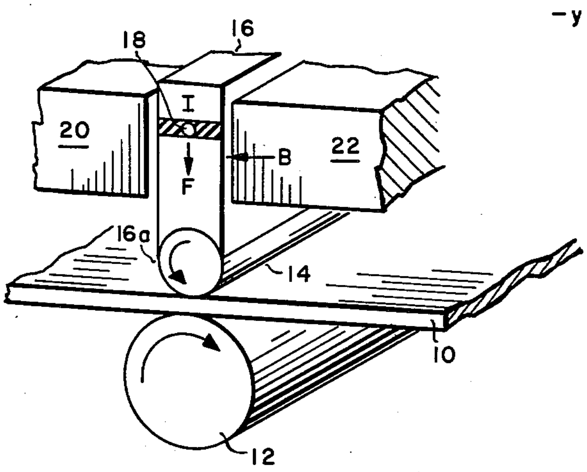
FIG. 5 is a somewhat diagrammatic perspective view of one form of drive mechanism embodying the invention.

FIG. 5 schematically illustrates one form of tape drive mechanism which accomplishes these objectives. In this mechanism, the tape 10 is positioned between a continuously driven capstan 12 and a pressure roller 14. The pressure roller 14 is continuously driven in rotation and is supported by means (to be described) so as to always be pressing the tape against the capstan. When the tape is stationary, the pressure roller 14 exerts a force about one-tenth to one-twentieth the force necessary to impart motion to the tape. When the tape is to be driven, cylindrical roller 14 is urged toward roller 12 with a greater force, sufficient to trap and drive the tape.

The cylindrical roller 14 is maintained in light contact with the upper surface of the tape by a short bar 16 having a concave bearing surface 16a at one end thereof to receive the roller. The roller 14 and member 16 (as well as the capstan 12) are coextensive with the width of the tape 10. Imbedded within the bar 16 and insulated therefrom is one side of a coil 18 which extends throughout the length of the bar. The bar is positioned between the poles 20 and 22 of a permanent magnet with the side of the coil 18 positioned in a homogeneous magnetic field, designated B, the coil itself also affording mechanical support for the bar. When it is desired to drive the tape, a current is applied to the coil, causing a force equal to $F=IBl$ to be exerted by the roller 14, against the tape. I is the current through the conductor, B is the field strength, and $l$ is the length of the conductor 18. Assuming a force requirement of 1.5 pounds, or 6.67 newtons, and a flux density of 0.1 webers per square meter (easily obtained by permanent magnets), then the current required is 900 ampere-turns. Assuming an inductance of $200\times10^{-6}$ henry for a 30 turn loop, and allowing $40\times10^{-6}$ second for current buildup, the voltage required is 150 volts, parameter values easily handled by silicon controlled rectifier circuits.

When the current is applied to the coil, the force F is initially generated in the region of the coil side 18 and propagates as a stress wave along the bar 16. The force wave travels at the speed of sound from its point of origin to the roller 14, a typical value for the speed of sound in metals being $5\times10^5$ centimeters per second. Hence, for a short bar, the force wave may reach the roller 14, say 2 to 4 microseconds after application of the current. When the force wave reaches the roller, a complex transformation necessarily takes place because of the curved boundary presented by the roller 14. At the center line of the tape, the boundary condition is that of $y=0$; i.e., the displacement of the tape, from symmetry, is zero. All other elements of the drive mechanism including the drive roller, the force bar, and the tape itself (except its line of symmetry) experience deformation as a result of the induced stress wave and their elasticity. Many reflections of the stress wave undoubtedly take place from the surface of the roller member before steady state conditions result, but due to the relatively small dimensions of the roller 14 in a practical mechanism, these many reflections will occur in a comparatively short time, of the order of 5 to 10 microseconds. In addition to the reflections which take place in and about the roller, reflected waves will traverse the bar 16, and because of the larger dimension of the bar, these reflections may persist for a greater length of time. However, by proper choice of the waveform of the input current, it is possible to suppress these reflections in the member 16.

When the incident stress wave reaches the roller 14, a reflected stress wave occurs which is of the same sign as the incident wave. This fulfills the boundary condition that $y=0$. The total stress at this boundary, then, is twice the value of the incident stress wave. When the reflected wave reaches the end of the bar 16 at which the force was initially applied, namely, at the coil side 18, the sum of the incident and first reflected wave is equal to twice the value of the incident wave. The boundary condition that $\zeta=0$ at this end can be fulfilled in two ways; either by a second reflection, or by changing the boundary condition to equal the condition present in the member. The latter can be accomplished by abruptly increasing the current in the conductor to a value twice that initially applied at a time to coincide with the arrival of the first reflected wave at the conductor. The suppression of the reflected wave insures a substantially constant force at the roller 14 following the arrival of the incident wave at the roller and effectively eliminates rebound of the roller.

In summary, the displacement of roller 12 from the position where it contacts but does not drive the tape to the position where it exerts the force necessary to drive the tape is just equal to the elastic deformation of the tape, which is very small because the tape is thin. By way of example, the thickness of a conventional 1.5 mil thick magnetic tape is reduced by about eight microinches at the nip of opposed rollers of practical dimensions when the force applied is sufficient to drive the tape. Thus, the displacement of each roller is about four microinches. Accordingly, the time between application of the current, and hence generation of a stress wave, and the appearance of the driving force at the nip of rollers 12 and 14 is only that time required for the stress wave to propagate in the bar 16 through the distance from coil 18 and across the diameter of roller 14. By suppressing the wave reflected from the boundary of the bar 16 with roller 14, bounce or rebound of member 16 is substantially eliminated whereby the force on the tape is substantially constant once it is applied. In short, the time required for the pinch roller to move from its non-driving position into driving engagement with the tape is substantially reduced and the time for mechanical transients to be dissipated is shortened to a minimum.

While the mechanism of FIG. 5 utilizes a single force member 16 in cooperation with a driven capstan 12, it may be preferable to substitute for the capstan another force member 16 of the type described. In this arrangement, diagrammatically illustrated in FIG. 6, no distinction is made between the pressure roller and the capstan; both rollers, 14 and 14' are continuously driven in rotation by suitable means (not shown). The two rollers are driven in opposite directions, as indicated, and are supported to bear very lightly on the tape 10 passing between them when the tape is stationary or moving to the right (under control of another driving mechanism, not shown). When the tape is to be moved by the illustrated rollers, current is applied to coils 18 and 18', each of which is positioned in a homogeneous magnetic field indicated by B, which forces the two rollers together. As in the mechanism of FIG. 5, a stress wave in each of the bars 16 and 16' travels at the speed of sound from its origin to the rollers, a typical value for this velocity of propagation in metals being $5\times10^5$ centimeters per second. Hence, the stress wave in each of the members may reach their corresponding roller approximately 5 to 10 microseconds after the application of the current.

Figures 6, 7:
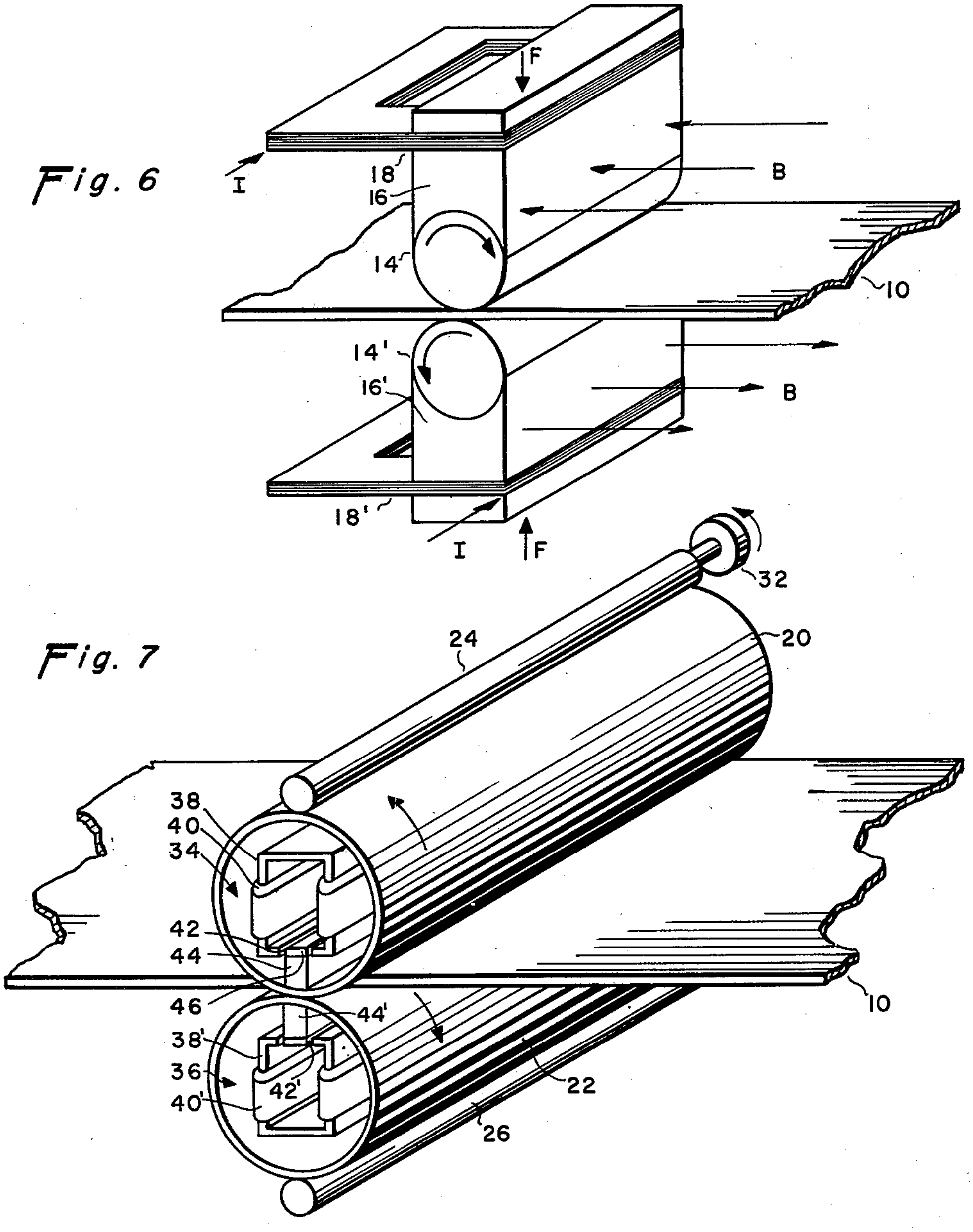
FIG. 6 is a perspective view of a drive mechanism similar to that illustrated in FIG. 5 but incorporating two coacting force bars.
FIG. 7 is a perspective view, somewhat diagrammatic, of another tape transport driving mechanism embodying the invention.
Figure 8:
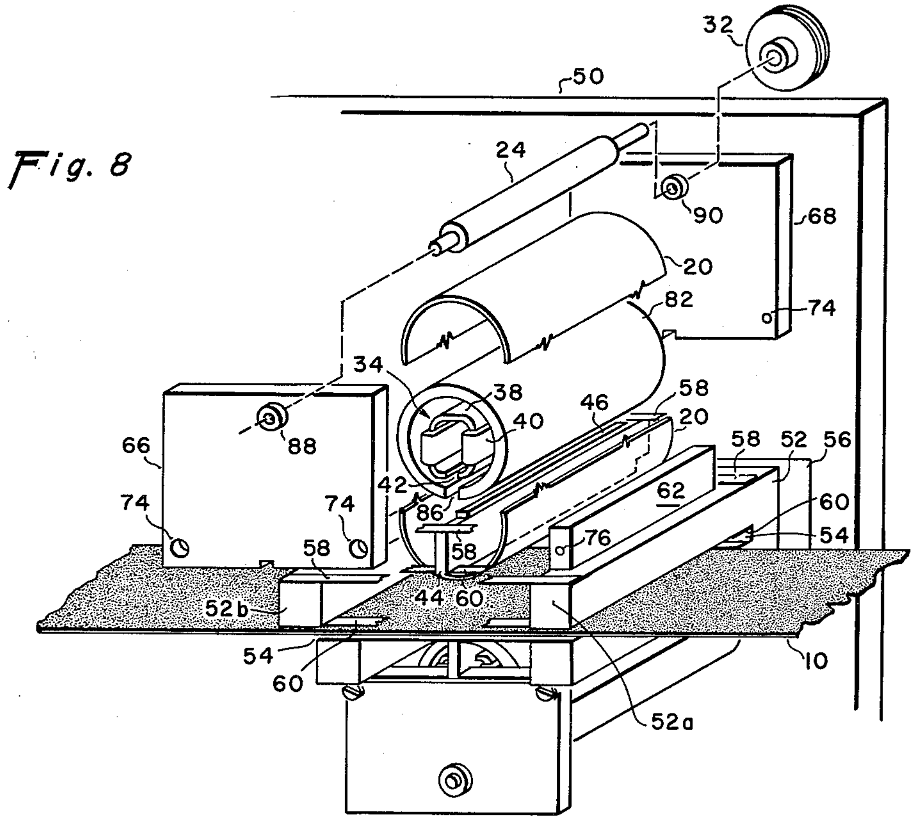
FIG. 8 is an exploded isometric view illustrating the details of construction of one of the drive tubes of the mechanism of FIG. 7.

A preferred tape drive mechanism embodying the invention is schematically shown in FIG. 7, and illustrated in detail in the exploded view of FIG. 8. Considering first the general operation of the mechanism with reference to FIG. 7, the tape 10 is driven by a pair of hollow cylindrical tubes 20 and 22 supported on opposite sides of the tape. The tubes, formed of a very thin-walled tubing, are supported on cylindrical bearings (not shown in FIG. 7) and continuously driven in rotation in opposite directions, as indicated, by drive shafts 24 and 26, bearing on the external surface of tubes 20 and 22, respectively. A typical wall thickness for the tubing is 3 mils, making them very flexible. Shafts 24 and 26 are driven in opposite directions by a pulley drive, for example, one of which is shown connected to shaft 24 at 32. The axes of shafts 24 and 26 are parallel to each other and to the axes of driving tubes 20 and 22. The tubes 20 and 22 are supported on cylinders 82, one of which is shown in FIG. 8. The tube 20 conforms to the surface of cylinder 82 at least in the area in which the tube is in tension. The surface of the cylinder is interrupted by a slot 86 to pass the force bar 44. So that the tube will slide freely over the cylinder the inside diameter of the tube is slightly larger than the outside diameter of the cylinder. This discrepancy in dimensions is kept sufficiently small to restrain the tube from skewing on the cylinder.

Mounted within each of drive tubes 20 and 22 is an electromagnet 34 and 36, the former including a magnetic core 38 and a winding 40 and the latter having a core 38' and a winding 40'. The core is formed with an elongated air gap 42 disposed parallel to the axis of the drive tube and coextensive with the drive tube, in which is supported a force bar 44 having an armature 46 disposed between the confronting pole pieces of the core. The force members 44 and 44' are supported at their ends on springs (to be described hereinbelow) so as to bear on the inner surface of their respective drive tubes with sufficient force to keep the drive tubes in contact with tape 10. The force exerted by these springs is insufficient to trap the tape between the drive rollers. That is, in the mechanism of FIG. 7, which is intended to drive the tape toward the right, when the tape is moving to the left or is stationary, the drive tubes bear on the tape only with enough force to maintain contact. However, when current is applied to the windings 40 and 40', which are connected in series, the force bars 44 and 44' are urged into firmer contact with their respective drive tubes and elastically deform the tubes to increase the traction between the tubes and the tape to a value sufficient to drive the tape to the right without slipping. Assuming a coefficient of friction between the tape 10 and one of the drive tubes to be 0.2, the tubes must be pressed against the tape with a force of 1.5 pounds to create the necessary driving force of 0.6 pound to move a 2-inch wide tape at 30 inches per second. When a force of 1.5 pounds is applied to a tubular roller three inches in diameter, the roller is forced into the tape a distance less than four microinches.

FIG. 8 is an exploded isometric view of one of the drive tubes and illustrates the manner in which the several parts of the assembly are mounted to achieve the desired driving action. The drive mechanism is designed for mounting in a horizontal position on a vertically disposed panel 50, the principal support for the driving mechanism being a U-shaped member 52, each of the arms of which is bifurcated to provide a gap 54 through which the tape 10 is transported. The member 52 is rigidly attached to the panel 50 by insertion in a cutout 56 in the panel. Considering now only the portions of the U-shaped member lying above the tape 10, a pair of flat springs 58 and 60 are respectively secured to the upper and lower surfaces of the extremities of the arms 52*a* and 52*b*. The springs are formed of thin stock and are designed to exert a slight spring force. The force bar 44 (to which reference was made in FIG. 7) is supported at its ends on these springs, the bar being secured between the upper and lower spring at a point equally spaced from arms 52*a* and 52*b*. An armature 46 formed, for example, of laminated iron, is secured along the upper edge of the force bar 44. It will be noted that the armature is somewhat shorter than the force bar, the reason for which will be seen later. The springs support the force bar internally of the thin-walled cylindrical tube 20 to exert a light non-driving force against the inner surface of the tube under normal operating conditions.

Support for the balance of the drive mechanism is afforded by a pair of members, one of which is visible in the drawing and identified by numeral 62, respectively secured to the upper surface of arms 52*a* and 52*b*, and a pair of end plates 66 and 68. When assembled, the end plates are secured to members 62 and 64, as by screws inserted through openings 74 into tapped holes 76. The force bar 44 projects beyond the end plates such that the springs 58 and 60 are external of the assembly. The end plates are notched to clear the force bar.

Drive tube 20 is supported diametrically opposite from the force bar 44 on a cylindrical core 82, in turn supported by end plates 66 and 68. The housing core 82 is in the form of a hollow tube, preferably formed of a smooth non-magnetic material, having an outside diameter slightly smaller than the inside diameter of the drive tube 20. The housing core is just slightly longer than the drive tube 20 and is rigidly held in position internally of the tube by the end plates 66 and 68 urged against its ends. The core may be provided with lubricating bearing material at one or more points about its periphery to minimize the friction between tube and core. Thus, the cylindrical core 82, which is rigidly secured in position by end plates 66 and 68, serves as a large bearing over which tube 20 slides when driven in rotation by drive shaft 24. An elongated slot 86 extending throughout the length of the core of a width sufficient to clear force bar 44. is formed in the wall of the core.

Within the hollow core 82 is mounted an electromagnet 34 including a magnetic core 38 generally coextensive with the length of the housing having windings 40 on the legs thereof. The core has an elongated air gap 42 aligned with the opening 86 in the housing. When assembled, the armature 46 is supported in a position between, and with its upper surface slightly above, the opposing pole pieces of the core 38, whereby upon application of current to the windings 40, the armature is urged downwardly, increasing the force exerted by the force bar on the inner surface of the driving tube 20 throughout the length thereof. The electromagnet is preferably supported within the core 82 by filling the space between the magnet assembly and the cylinder with a suitable potting compound.

The drive tube 20 is driven in rotation by a drive shaft 24, journalled at its opposite ends in bearings 88 and 90, respectively carried by end plates 66 and 68. The drive shaft is formed of resilient material, such as rubber, to insure good traction with the drive tube 20, and to eliminate the need for adjustment of the spacing between the axis of the shaft and the surface of the tube. The drive shaft is driven in rotation, for example by a belt drive coupled to pulley 32, and through coaction with the core 82, drives the tube 20 in rotation. Because of the small difference in the diameters of the tube and core, and its flexibility, tube 20 may be deformed slightly in the region of its line of contact with the tape by applying a force to member 44. Drive roller 24 and bearing 82 being rigidly mounted with respect to each other, this deformation of tube 20 does not affect the traction between drive roller 24 and tube 20. The wall thickness of tube 20 is sufficiently small that this deformation can be accomplished with a small force. This characteristic of tube 20 serves two purposes. Since the tube can be easily deformed, irregularities in tape thickness, caused by tape splices for example, can pass between the drive tubes 20 without hindrance. The flexibility of the drive tubes also makes it possible to grip the tape between them by applying a force to the inner surface of each of the tubes. As shown in the drawings, the point of application of the force is at the nip of the rolls, in the immediate neighborhood of the tube-to-tape contact. In order that the means for applying this force does not interfere with the first-mentioned purpose of having flexible drive tubes, it is essential that the means apply a force which, within limits, is independent of the deformation of the tubes. To this end, the force is applied to the tubes in a controllable manner by the electromagnet including core 38 having windings 40 thereon, and the force bar 44. It will be recalled that the core 38 is rigidly positioned within the bearing core 82 which, in turn, is rigidly attached to the frame. The armature assembly 44, 46 is free to move relative to the core 38 to thereby apply a force to the inner surface of the drive tube 20 in the immediate neighborhood of the nip of the cooperating drive tubes.

It will be understood that the portion of the drive mechanism which engages the underside of the tape 10, a portion of which is shown assembled, is identical with the structure just described, one being a mirror image of the other, with the second drive tube also supported on the U-shaped member 52.

Reviewing the description of FIGS. 7 and 8, the mechanism achieves direct transmission of the tape engaging force over a short path from its point of generation to a line contact on the driving tubes opposite the point of tube-to-tape contact. The edge of the armature assembly engaging the inner surface of the drive tube is preferably formed of lubricated bearing material to facilitate sliding of the drive tube over its surface. The laminated armature of the force bar assembly is positioned between the poles of the electromagnet, and upon energization of the electromagnet, the armature assembly exerts the required force on the drive tube. The electromagnet is firmly positioned within the core, and the armature assembly is supported by light springs which serve to position the armature laterally without interfering with its operation, and to bias the armature into light contact with the drive tube when the electromagnet is not energized.

When the electromagnet is energized, the stress wave generated in the armature is propagated through the force bar 44 to the drive tube, moving at the velocity of sound in the armature material. A typical value for the velocity of sound in metals is 0.5 centimeter per microsecond. The dimension of the force bar between the armature and the tape in a practical embodiment being of the order of one centimeter, the force will appear at the drive tube and be applied to the tape approximately 2 microseconds after it is generated. Although there is no gross motion of the armature assembly, there is some tendency for chatter at the interface of the force bar 44 and the inner surface of the drive tube 20, for the reasons described earlier. When the stress wave generated by one armature meets at the tape the stress wave generated by the other, there is some reflection of the stress waves because of the mismatch in boundary conditions. These reflected stress waves travel back toward their respective armatures, and upon reaching the armature the secondary reflected stress waves give rise to another set of stress waves. This reflection and re-reflection of stress waves continues until the energy in the stress waves is dissipated, the effect being variation in the force exerted on the drive tube by the force bar. This variation may be kept to acceptable levels in the two ways described earlier in connection with FIGS. 5 and 6. The exact solution is to modify the electromagnet current so that the first reflected stress wave meets a matched boundary condition upon its arrival at the armature. Another acceptable solution is to increase the current in the electromagnets comparatively slowly so that each reflection is small compared to the final value of the force. This can be accomplished with a current rise time of 20 to 50 microseconds. The technique is equally applicable to the mechanisms of FIGS. 5 and 6.

Figures 1, 2:
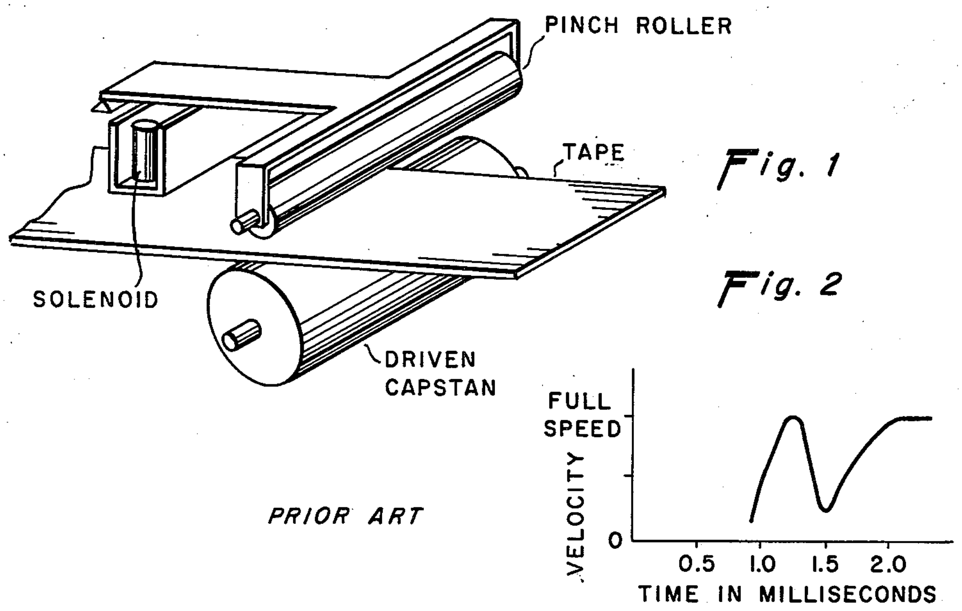
FIGS. 1 and 2 are respectively a schematic diagram of a prior art driving station, and its response characteristic, referred to above to explain the deficiencies of available drive mechanisms and to which further reference will not be made.

A significant advantage of this mechanism is that the desired force, whether for driving or during idling operation, can be exerted on the tape independent of irregularities in the thickness of the tape, or thickness of the material of which the drive tubes are fabricated. Another important advantage is that the drive force is generated throughout the length of the drive tube; that is, across the complete width of the tape, and transmitted to the point of application by a simple, high-speed path through the force member from the armature to the point of contact with the tape. It is emphasized that the force bar and drive rollers are subjected only to longitudinal stresses, as contrasted with the flexure which occurs in the fork in the prior art structure of FIG. 1. Related to simple mechanical structures, the fork of the prior art system corresponds to a beam, and the present force bar can be likened to a column. It is fundamental that a beam in flexure deflects considerably more upon application of a given force than does a column in compression. For this reason, the natural frequency of the present structure is much higher than that of the conventional drive mechanism of FIG. 1 whereby the period of rebound is appreciably shortened.

Another advantage of the present structure is the substantial elimination of skew. In the typical drive system of FIG. 1, it is virtually impossible to prevent one edge of the pinch roller from striking the tape before the other end. The first end to strike the tape imparts a velocity to that edge of the tape to cause skew. In the present mechanism, the drive rollers are always in contact across the entire width of the tape, thus substantially eliminating this cause of skew.

Figure 9:
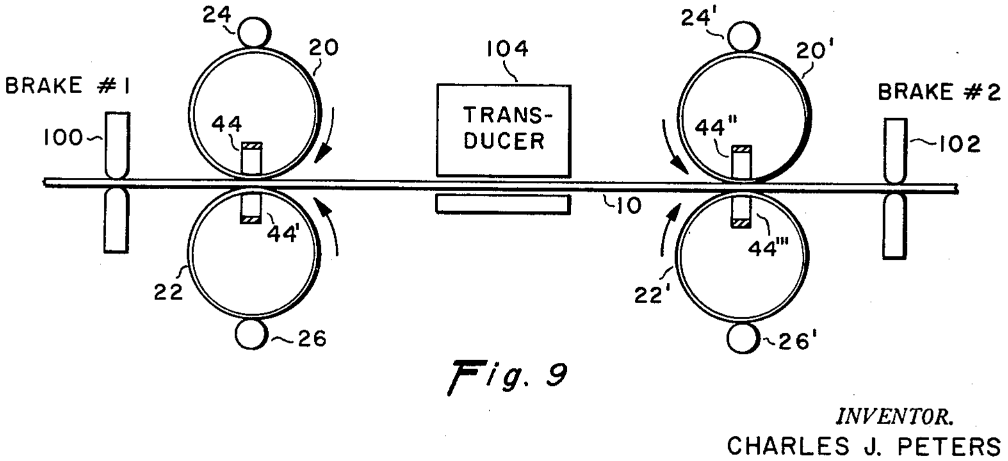
FIG. 9 is a diagrammatic illustration of a complete rapid response tape transport utilizing the invention.

FIG. 9 diagrammatically shows a complete tape transport as might be required for the recording and reproducing of digital information on a magnetic tape. The system includes two driving stations each comprising a pair of counter-rotating cooperating drive tubes 20 and 22, one station to drive the tape to the left and the other station to drive the tape to the right. A transducer 104, which forms no part of the present invention, is positioned between the two driving stations, with the tape drawn therethrough. An eminently suitable transducer for recording digital data along tracks transversely of the direction of tape motion is described in copending applications S.N. 741,401, now Pat. No. 3,152,225 and S.N. 843,275, now Pat No. 3,084,227, filed on June 11, 1958 and September 29, 1959, respectively, by the present applicant and assigned to the same assignee. The system is completed by a pair of brakes 100 and 102 disposed on the sides of the driving stations remote from the transducer 104. The brakes may be of the same general construction as the drive mechanisms described above with the omission of the drive shaft and drive tube. That is, the brake may comprise an electromagnet coextensive with the width of the tape and a force bar, similar in construction to member 44, supported to be forced into engagement with the tape upon energization of the electromagnet. To stop the tape, when it is moving to the right in FIG. 9, the electromagnet of brake 100 is energized to engage the tape, and the electromagnets for armatures 44'' and 44''' are simultaneously de-energized. When the tape is moving to the left, under control of drive tubes 20 and 22, the tape is stopped by energizing brake 102 and de-energizing the electromagnets associated with drive tubes 20 and 22. The direction of tape movement may be reversed without going through the intermediate step of stopping the tape by de-energizing the electromagnets associated with one set of driving tubes and quickly thereafter energizing the electromagnets associated with the other set of driving tubes to drive the tape in the opposite direction. The only prohibited transition is from tape travel to the right to brake 102, and from tape travel to the left to brake 100.

The solenoid coils associated with each pair of cooperating driving tubes are connected in series so as to actuate their corresponding force bars simultaneously. Brakes 100 and 102, likewise, each include a pair of electromagnets, one on either side of the tape, whose windings are serially connected. To change from one transport state to another, for example from travel to the left to the stopped condition, the current is transferred from the set of coils associated with driving tubes 20 and 22 to the coils associated with brake 102. The circuit of FIG. 10 accomplishes this current transfer quickly with minimum average power dissipation.

Figure 10:
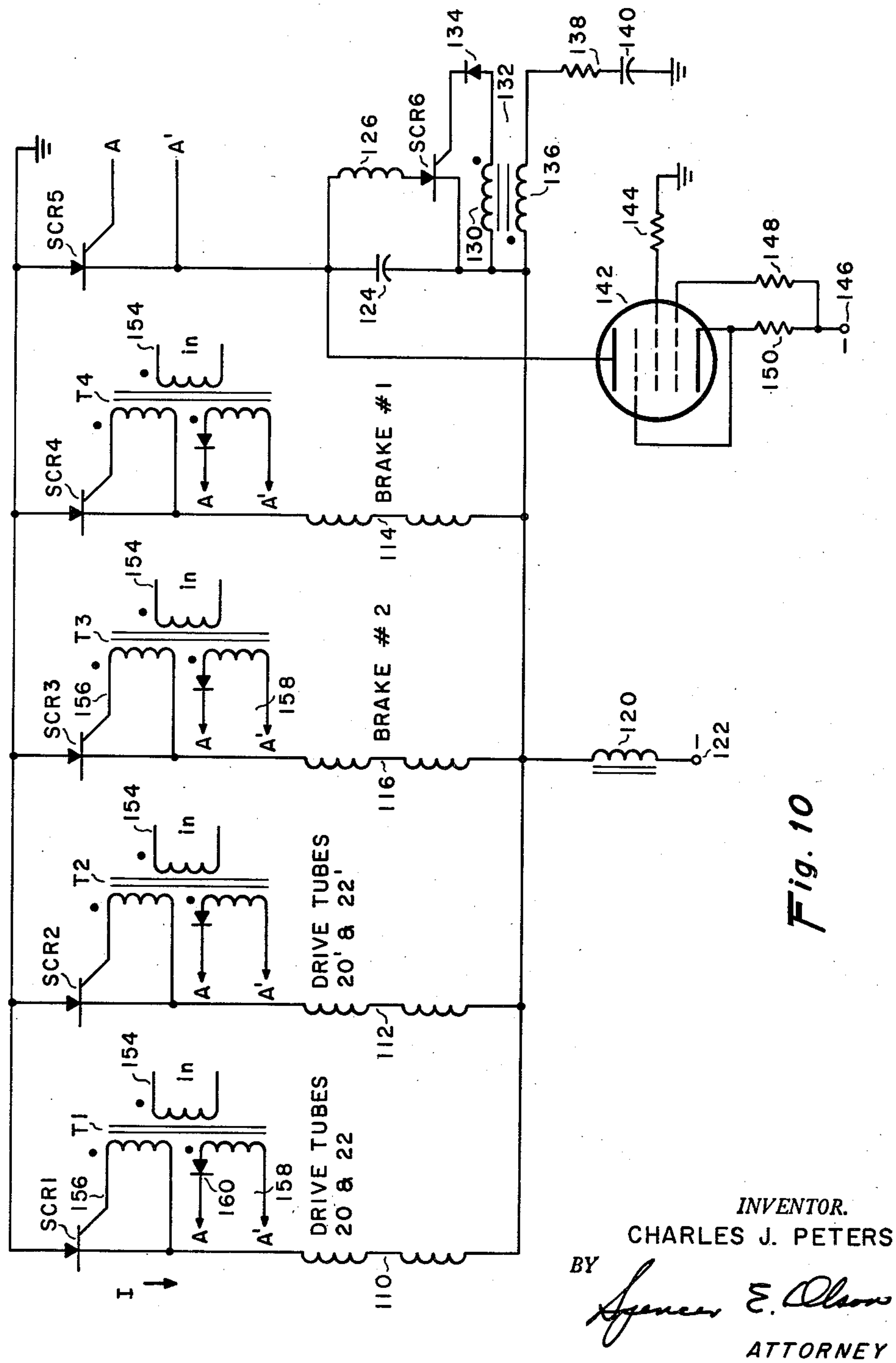
FIG. 10 is a schematic diagram of a circuit for switching currents from one electromagnet to the other of the driving mechanism of FIG. 7.

Referring to FIG. 10, the serially connected electromagnet windings associated with drive tubes 20 and 22 are designated 110, the coils associated with drive tubes 20' and 22' (FIG. 7) are designated 112 and the coils for actuating brakes 100 and 102 are respectively designated 114 and 116. Each of these coils is connected in series with a silicon controlled rectifier respectively designated SCR 1, SCR 2, SCR 3 and SCR 4, between ground potential and through a common inductor 120 to a source of negative potential at terminal 122. For reasons which will be seen later, in a practical circuit the source represented by terminal 122 preferably has a potential of about −6 volts and a current capacity of about 30 amperes. A silicon controlled rectifier, figuratively speaking, is a solid state thyratron having the ability of withstanding forward and reverse voltages up to 350 volts without breakdown, and when triggered on, of conducting high currents, in the forward direction only, of the order of 16 to 30 amperes, with a voltage drop of only a few volts. A low power level current in the gate-cathode circuit acts to switch the controlled rectifier into the conducting state even though an anode voltage of less magnitude than the forward breakdown voltage is impressed on the cell.

Connected in parallel with the series combinations of electromagnet coils and silicon controlled rectifier is a capacitor 124, also connected in series with a silicon controlled rectifier SCR 5, and in parallel with capacitor 124 is a series combination of inductor 126 and silicon controlled rectifier SCR 6. The secondary winding 130 of a pulse transformer 132 is connected in series with a diode 134 in the gate-cathode circuit of controlled rectifier SCR 6. The primary winding 136 of the pulse transformer is connected from the negative bus of the circuit to ground through a differentiating network consisting of resistor 138 and capacitor 140. The anode of a pentode 142 is connected to the junction of capacitor 124 and its associated silicon controlled rectifier SCR 5. The suppressor grid of the tube is connected to the cathode, the screen grid is connected to ground through resistor 144 and the control grid and cathode are connected to a source of negative potential, represented by terminal 146, through resistors 148 and 150, respectively. In a circuit which has been satisfactorily operated, a potential of −175 volts was applied to terminal 146 with resistors 148 and 150 having values of 1000 ohms and 100 ohms, respectively.

A pulse transformer $T_1$ through $T_4$ each having a primary winding 154 and two secondary windings 156 and 158 is associated with each of silicon controlled rectifiers SCR 1 through SCR 4. The primary winding 154 of each of the transformers is coupled to a corresponding source of positive pulses for controlling the SCR's. Each of the secondaries 158 is connected in series with a diode 160 and to the terminals A and A' which, in turn, are respectively connected to the cathode and gate electrodes of SCR 5. The secondaries 156 are connected in the gate-cathode circuit of the silicon controlled rectifiers SCR 1 through SCR 4.

Assuming, for example, that full current is flowing in serial windings 110 (that is, drive tubes 20 and 22 are driving the tape to the left), and that the current is to be transferred to windings 116 (brake 102) to stop the tape. With current flowing in windings 110, and all of the other SCR's non-conducting, capacitor 124 will have been charged to a large negative voltage by current supplied by pentode 142, which acts as a source of current. To initiate the current transfer to winding 116, a positive pulse is applied to the primary 154 of pulse transformer $T_3$. The secondary 156 of pulse transformer $T_3$ supplies a gating pulse to SCR 3 of a duration such that it will be positive at the appropriate time, as will be seen later. The other secondary 158 of transformer $T_3$ supplies a coincident gating signal to SCR 5. Conduction of SCR 5 effectively connects capacitor 124 across windings 110, and hence applies a large voltage thereacross. The application of this large voltage to the resulting series connected L-C circuit sets in motion a harmonic transient during the first quarter cycle of which the current in windings 110 is decreased to zero and SCR 1 extinguished, and during the next quarter cycle of which the current is transferred to the branch which contains the triggered SCR; i.e., SCR 3 and winding 116.

Figure 11:
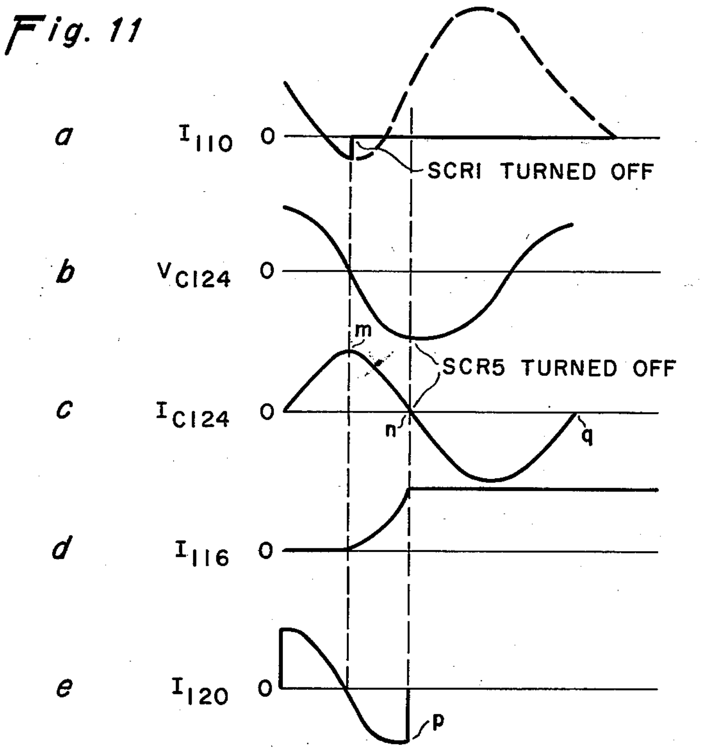
FIG. 11 is a series of waveforms useful in explaining the operation of the circuit of FIG. 10.

More specifically, the initial polarity of the voltage on capacitor 124 is chosen so that when it is applied across the windings 110 carrying current in the direction shown, the capacitor voltage tends to decrease the current in windings 110. This initiates a transient in which the current in windings 110 follows the sinusoidal variation shown in FIG. 11*a*. Were it not for SCR 1, the current would reverse its direction and follow the dotted curve of FIG. 11*a*. However, as was noted earlier, the silicon controlled rectifier conducts only in the forward direction. When the current in winding 110 reaches zero, the voltage on capacitor 124, shown in FIG. 11*b*, has also fallen to zero. The current from the power supply 122 has now been transferred from windings 110 to the capacitor 124 as shown at *m* in FIG. 11*c*. During the next quarter cycle of the transient, the current in capacitor 124 decreases sinusoidally and increases sinusoidally in winding 116, SCR 3 being still gated on by a positive pulse applied to the primary 156 $T_3$. When the current in capacitor 124 reaches zero, at *n* in FIG. 11*c*, SCR 5 opens, and the voltage across inductance 120 collapses to zero, as indicated at *p* in FIG. 11*e*. The circuit is now in the steady state with a substantially constant current of magnitude $I_1$ flowing in the selected winding 116.

During this switching process, the voltage on capacitor 124 has reversed polarity. The pentode 142 connected as shown to a source of negative potential slowly restores the charge on capacitor 124 to its original state. To accomplish this restoration more quickly, SCR 6 is connected in series with an inductance 126 across capacitor 124. SCR 6 is triggered by pulse transformer 132, the primary of which is connected between the negative bus of the circuit and ground through a differentiating network of resistor 138 and capacitor 140. When the voltage across inductor 120 collapses at the end of the transient, pulse transformer 132 provides an output pulse to the gate electrode of SCR 6 to trigger it on. The illustrated polarity of transformer 132, and the series diode 134, insure that only the voltage collapse at the end of the transient triggers SCR 6. When this controlled rectifier is triggered, a transient is initiated in the LC circuit involving capacitor 124 and inductance 126, which is independent of, but similar in action to the earlier described switching transient in the main circuit. The voltage and current vary sinusoidally as shown to the right of the second vertical dotted line in FIGS. 11*b* and 11*c*. When the current in capacitor again goes to zero, at *q* in FIG. 11*c*, SCR 6 opens and the potential on capacitor 124 has returned almost to its original value. The pentode 142 supplies the small additional charge required to restore the capacitor to its full voltage. The circuit is now in readiness to be switched to any of the other solenoid coils 110, 112 or 114.

Should it next be desired to actuate drive tubes 20' and 22' (FIG. 7), the transfer of current to windings 112 is initiated by application of a positive pulse to the primary 154 of transformer $T_2$, the circuit thereafter automatically accomplishing transfer of the current from windings 116 in the manner described above. It is to be noted that during each switching sequence only the two branches between which current is being transferred, and the branch including capacitor 124, are affected, because of the characteristics of the silicon controlled rectifier. The diode 160 in the secondary 158 of each of pulse transformers $T_1$ through $T_4$ prevents feedthrough of the gating pulse applied to the selected branch to the gate-cathode circuits of the other SCR's. It will be apparent, threefore, that additional parallel branches may be added to the circuit of FIG. 10 should a particular application require more solenoids.

One particular advantage of this circuit is that no disabling signal need be applied to transfer current from one coil to another. A signal is applied only to that branch to which the current is to be transferred. The operation of the circut being independnet of past history greatly simplifies the logical control circuitry associated with this circuit. The circuit of FIG. 10 is described in greater detail and claimed in applicant's co-pending application S.N. 862,335.

It will be recalled from the description of FIGS. 7 and 8 that the reflections of the stress wave in the force bar 14, which would unless precautions are taken to have the reflected wave meet a matched boundary condition cause variations in the force exerted on the tape, can be acceptably attenuated by increasing the current in the electromagnet relatively slowly. The rise time of the current in windings 116 (FIG. 11*d*) from zero to its steady state value $I_1$ in the circuit of FIG. 10 is of the order of 40 microseconds, an appropriate rate of change of the current to provide the requisite boundary condition. Thus, the circuit, besides affording a convenient and rapid means for switching from one electromagnet to another, provides the proper wave shape immediately following initiation of the command to appreciably minimize bounce or rebound of the drive bars.

Figure 12:
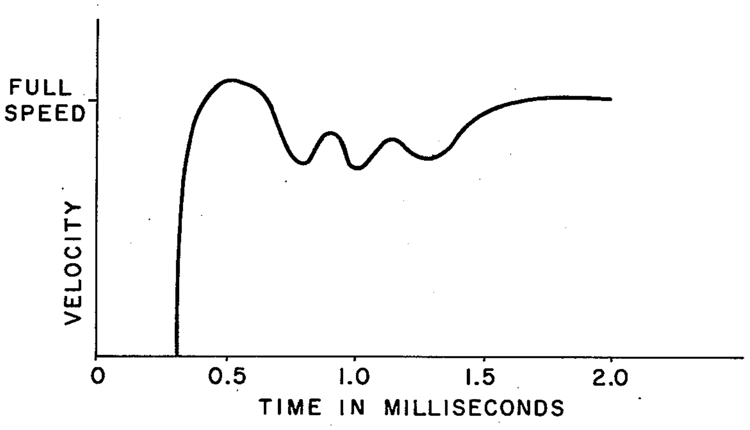
FIG. 12 is a curve illustrating the starting performance characteristics of the drive mechanism of FIG. 6.

FIG. 12 illustrates the starting characteristics of an initial model of a mechanism of the form shown in FIG. 6, and utilizing the circuit of FIG. 10. The tape reached its full design velocity approximately 400 microseconds after the start command, followed by a slight overshoot in velocity. Of this 400 microseconds, approximately 80 microseconds were required to energize the electromagnets (the inductance of the conductors in the embodiment of FIG. 6 is larger than in the circuit of FIG. 10), and another 80 microseconds was required for the propagation of the velocity wave on the tape from the point of application of the force to the play-back head. This leaves about 240 microseconds of the start time to be accounted for, a portion of which is the time for the stress wave in the force bar to propagate from the conductor to the roller 14, and the remainder probably being due to mechanical deficiencies in the preliminary model. It is expected that the design of FIG. 8 will correct these deficiencies to achieve a start time between initiation of the command and full speed of 200 to 250 microseconds. The failure of the tape to stay at full speed in the period between 0.5 millisecond and 1.75 milliseconds was probably due to stray reflections set up in the tape because of improper guiding of the tape. It is expected that this will be appreciably improved with the design of FIG. 8 and improved tape guiding structure.

From the foregoing it is seen that the objects of the invention are achived by the disclosed mechanism wherein the pinch roller and capstan are continuously rotating to eliminate rotational inertia, and are continuously in contact with the tape to minimize translational inertia. Force for driving the tape is applied as a stress wave at the point of drive-to-tape contact initiated by application of an electric current and rapidly propagating along a short distance between the point of initiation and the point of application. Means are provided ot minimize the rebound normally present immediately following the abrupt application of a force to an elastic medium, whereby the tape remains at substantially full speed after being initially driven to full speed substantially instantaneously upon application of the stress wave. These features contribute to a shortening of the time between command and execution, the mechanism showing promise of providing a total start time of 200 to 300 microseconds as compared with start time of 1500–2000 microseconds of currently available tape transports.

Although the invention has been described as applied to the start function, it is equally effective in stopping the tape. In the light of the analysis showing that the tape can be accelerated substantially instantaneously upon the application of a finite force, it follows that the tape can also be stopped substantially instantaneously without undue stresses being set up in the tape. In other words, the tape strength is not a limitation on the stop time, the time for stopping also being determined by the time required to apply current to the electromagnet and for the stress wave to propagate to the point of application.

While there has been described what is, at present, considered preferred embodiments of the invention, it will now be apparent to ones skilled in the art that many and various changes and modifications may be made without departing from the spirit of the invention. It is intended, therefore that all those changes and modifications as fairly wall within the scope of the appended claims be considered as a part of the present invention.

What is claimed is:

1. Tape transport apparatus comprising, in combination, first and second opposed continuously driven counter-rotating cylindrical rollers between which the tape is carried, said rollers having a length at least as great as the width of the tape, a pair of force bars substantially coextensive with said rollers respectively engaging the curved surface of said first and second rollers at points diametrically opposite from the tape, means resiliently supporting said force bars to urge said rollers toward each other to normally continuously contact said tape with a force greater than zero but less than that required to cause a traction between the rollers and the tape sufficient to drive the tape, and means coupled to said force bars and operative when energized to excite stress waves in each of said force bars which propagate to the line of contact between said rollers and the tape to increase the traction between said rollers and the tape to the finite value required to impart a linear velocity to the tape equal to the peripheral velocity of the driven rollers.

2. Tape transport mechanism comprising, in combination, a pair of opposed flexible thin-walled tubular members between which the tape is carried, first and second cylindrical bearing members within corresponding ones of said tubular members on which said tubular members are adapted to rotate, means operative when energized to drive said tubular members in opposite directions of rotation, first and second bars resiliently supported within said first and second tubular members, respectively, and engaging the inner surface of its respective tubular member along a line of contact parallel to the line of contact between said tubular members and said tape with a force sufficient that the traction between said tubular members and said tape is greater than zero but less than that required to drive the tape, and an electromagnet within each of said bearing members coupled to a respective bar and operative when energized to excite stress waves in said bars which elastically deform their respective tubular members in the region of said line of contact to increase the traction between said tubular members and said tape to the finite value required to impart a linear velocity to the tape equal to the peripheral velocity of said driven tubular members.

3. Tape transport mechanism comprising, in combination, first and second cylindrical bearing members supported in spaced apart parallel relationship, first and second thin-walled tubular roller members of slightly larger diameter than said bearing members respectively carried by said first and second bearing members and between which the tape is carried, means for driving said roller members in opposite directions on their respective bearing members, first and second elongated force bars respectively resiliently supported within said first and second roller members to engage the inner surface of its respective roller member throughout the length thereof opposite a common line of roller-to-tape contact with sufficient force to maintain said roller members in continuous contact with the tape but insufficient to drive the tape, and an electromagnet disposed within at least one of said roller members and coupled to its corresponding force bar and operative when energized to increase the force exerted by the force bar on the inner surface of the roller member sufficiently to deform the roller member by an infinitesimal amount to trap the tape against the other roller member to thereby drive the tape.

4. Tape transport mechanism comprising, in combination, first and second cylindrical bearing members supported in closely spaced apart parallel relationship, first and second thin-walled tubular roller members formed of flexible material and of slightly larger inside diameter than said bearing members respectively carried on said first and second bearing members and between which the tape is carried, means for driving said roller members in opposite directions on their respective bearing members, first and second elongated force bars respectively supported within said first and second roller members and each engaging the inner surface of its respective roller member opposite a common line of roller-to-tape contact, springs normally urging said force bars against their respective roller members with sufficient force to maintain said roller members in continuous contact with the tape but insufficient to drive the tape, first and second electromagnets respectively disposed within said first and second bearing members and coupled to a corresponding force bar and operative when energized to increase the force exerted by said force bars on the inner surface of said roller members sufficiently to deform said roller members in an infinitesimal amount to trap the tape between the roller members to thereby drive the tape.

5. In a tape machine, tape transport mechanism for rapidly starting and driving the tape, comprising, first and second opposed thin-walled tubular roller members co-extensive with the width of said tape, first and second cylindrical bearing members within corresponding ones of said roller members supporting said roller members on opposite sides of the tape, means for continuously driving said roller members in opposite directions on their respective bearing members, first and second force bars respectively positioned within and engaging the inner surface of said first and second roller members throughout the length thereof opposite a common line of roller-to-tape contact, springs supporting said first and second force bars in contact with the inner surface of said first and second roller members, respectively, with sufficient force to maintain said roller members in continuous contact with said tape but insufficient to drive said tape, first and second electromagnets respectively positioned within said first and second bearing members and coupled to respective ones of said force bars, said electromagnets being operative in response to the application thereto of an electric current to excite a stress wave in its respective force bar at a point near said common line of contact, which stress waves are propagated to said common line of contact at the speed of sound in the material of said force bars and deform the roller members in the neighborhood of said common line of contact sufficiently for the driven roller members to trap and drive said tape.

References Cited by the Examiner

UNITED STATES PATENTS

| | | | |
|---|---|---|---|
| 2,341,636 | 2/44 | Luehrs | 226—187 X |
| 2,880,997 | 4/59 | Brown | 271—45 |
| 2,943,852 | 7/60 | Quirk | 226—187 X |
| 2,959,334 | 11/60 | Uritis | 226—176 |
| 2,990,092 | 6/61 | Begun et al. | 226—176 |
| 2,995,287 | 8/61 | Namenyi-Katz | 226—187 |
| 3,002,670 | 10/61 | Namenyi-Katz | 226—176 |

FOREIGN PATENTS

| | | | |
|---|---|---|---|
| 716,229 | 9/54 | Great Britain. | |

ROBERT B. REEVES, *Acting Primary Examiner.*

JOSEPH P. STRIZAK, SAMUEL F. COLEMAN, ERNEST A. FALLER, JR., *Examiners.*